Feb. 3, 1948.  W. L. GOULD  2,435,539
GARDEN STAKE WITH CHAMBER FOR PLANT GROWTH
Filed Dec. 30, 1943  2 Sheets-Sheet 2
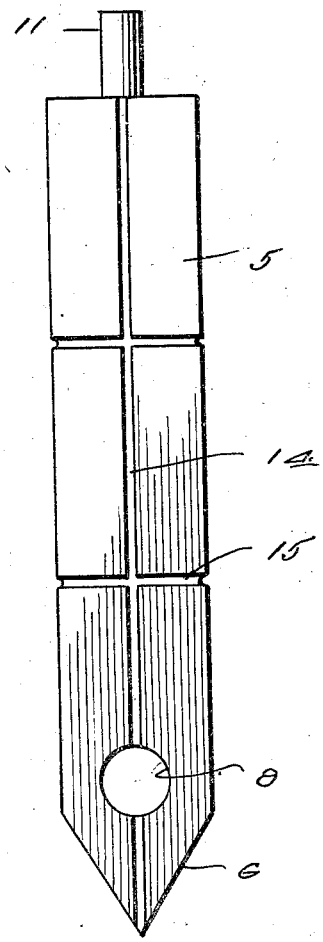
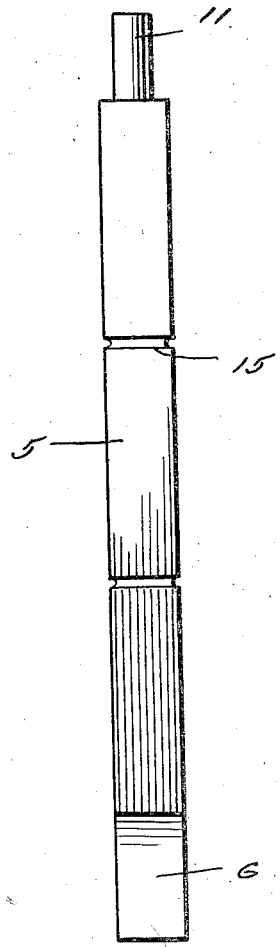
Inventor
WILLIAM L. GOULD
By Clarence A. O'Brien
and Harvey B. Jacobson
Attorneys Patented Feb. 3, 1948

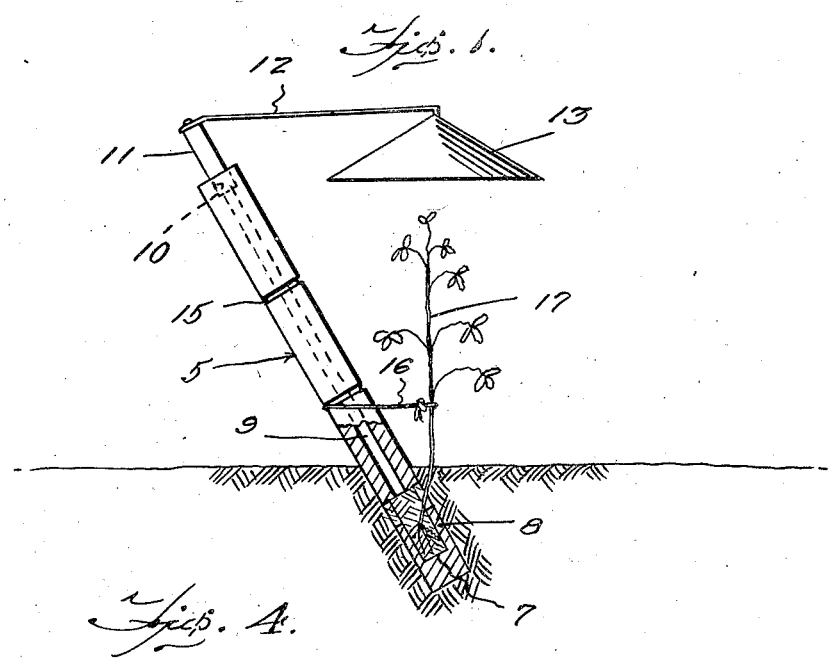
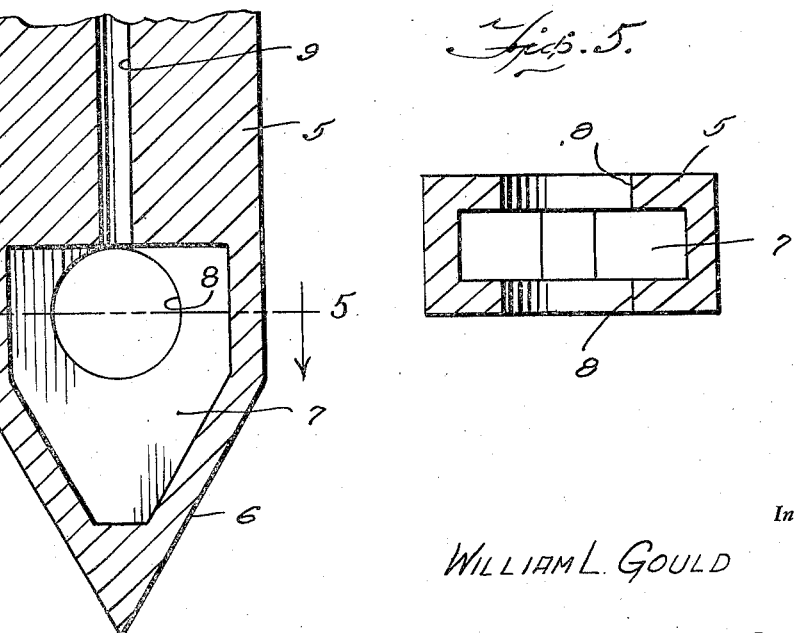

2,435,539

UNITED STATES PATENT OFFICE 2,435,539

GARDEN STAKE WITH CHAMBER FOR PLANT GROWTH

William L. Gould, Albany, N. Y.

Application December 30, 1943, Serial No. 516,234

3 Claims. (Cl. 47—34)

The present invention relates to new and useful improvements in plant stakes of a type designed to provide a support for a young plant and the invention has for its primary object to provide watering passages in the stake leading directly to the roots of the plant for watering the same with a minimum of water and loss of moisture.

A further object is to provide a stake of this character which provides means for planting seed in the ground in an efficient and simplified manner and at a predetermined uniform depth and in which the stake is then utilized to protect the plant during its early growth.

Another object is to provide a device of this character which reduces the uncertainty and hazards of gardening success by inexperienced persons, and which at the same time is simple and practical in construction, inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a view partly in elevation and partly in section of the stake shown in position in the ground.

Figure 2 is a side elevational view of the stake showing the irrigation channel and opening for the seed chamber in the bottom of the stake.

Figure 3 is an elevational view showing another side of the stake.

Figure 4 is a fragmentary sectional view through the lower end of the stake, and Figure 5 is a sectional view taken on line 5—5 of Figure 4.

Referring now to the drawings in detail, the numeral 5 designates a stake which may be of wood, plastic or other suitable inexpensive material and preferably of rectangular shape in cross section. The narrow sides of the stake at its lower end are beveled as shown at 6 to produce a sharpened end to facilitate penetration into the ground, while the other end is flat.

A chamber 7 is formed in the bottom portion of the stake and the wider sides of the stake are formed with openings 8 communicating with the chamber.

A longitudinal passage 9 extends substantially centrally through the stake from the chamber 7 to the top of the stake, the upper end of the passage being formed with an enlarged recess 10 in which a plug 11 is removably fitted for closing the passage. To the outer end of the plug is attached one end of an arm 12 which extends horizontally from the stake and to the outer end of the arm is attached a conical shield 13 of suitable weather resistant material.

A longitudinal channel 14 is formed in the outer surface of each of the wider sides of the stake which extends throughout the length thereof and bisects the openings 8.

Circumferential grooves 15 are arranged at vertically spaced intervals in the outer surface of the stake, which serve as measuring marks to indicate the depth at which the stake is driven into the ground as well as means for tying a cord 16 to the stake for supporting the plant 17.

In the use of the stake a garden seed may be placed in the chamber 7 and the stake then driven into the ground a desired depth, preferably at an inclined angle as shown in Figure 1 and with one of the wide sides of the stake uppermost. When driving the stake dirt will enter the openings 8 into the chamber 7 to provide the necessary nourishment for the seed, or the chamber may first be filled with a specially prepared soil or fertilizer. When the seed germinates the seed will sprout through the uppermost opening 8 while the roots of the plant will grow in the chamber 7 and may also spread outwardly of the openings.

The shield is positioned directly over the plant to serve as an umbrella to protect the tender plant from the sun and the shield may be adjusted horizontally by swinging the arm 12 on the plug 11.

The roots of the plant may be watered by removing the plug and pouring water into the passage 9, or water may be poured into the channel 14 which leads to the opening 8. Rain water will also travel downwardly in the channel 14 to the opening 8 to provide direct irrigation for the roots of the plant.

It will be apparent that the stakes will afford means of planting the seeds in the ground without requiring any preliminary treatment or preparation of the soil as the openings 8 for the plants will lie just beneath the surface of the soil and the soil in the immediate vicinity of the stake will be sufficiently loosened during the driving thereof to permit the plant to properly grow and the pretreated soil placed in the chamber 7 will insure proper concentrated nourishment for the plant.

The stakes may be made of separate pieces of material in order to form the chamber 7 therein and the pieces united in any suitable manner.

It is believed that the details of construction and manner of use of the device will be readily understood from the foregoing without further detailed explanation.

Having described the invention, what is claimed as new is:

1. A seed germinating device comprising an elongated stake having a pointed lower end and adapted to be driven into the ground at an inclination, said stake being formed with a relatively large chamber within the lower end portion thereof for reception of soil and seed, said chamber being of sufficient size to accommodate the roots of the seed when sprouted and sufficient soil to cover the seed, a side wall of the chamber being provided with a relatively large transverse opening which communicates with the upper portion of the chamber at one side of and above the bottom of the latter, said opening being of sufficient size to permit the seed to sprout upwardly through the same when the stake is driven into the ground at such inclination, the portion of the stake above said opening being formed with a circumferential groove for retaining reception of a cord adapted to be tied to the plant growing from the chamber so as to support said plant.

2. A seed germinating device comprising an elongated stake having a pointed lower end and adapted to be driven into the ground at an inclination, said stake being formed with a relatively large chamber within the lower end portion thereof for reception of soil and seed, said chamber being of sufficient size to accommodate the roots of the seed when sprouted and sufficient soil to cover the seed, a side wall of the chamber being provided with a relatively large transverse opening which communicates with the upper portion of the chamber at one side of and above the bottom of the latter, said opening being of sufficient size to permit the seed to sprout upwardly through the same when the stake is driven into the ground at such inclination, said stake further having a longitudinal water supply channel in one side thereof which intersects said opening so as to discharge into said chamber.

3. A seed germinating device comprising an elongated stake having a pointed lower end and adapted to be driven into the ground at an inclination, said stake being formed with a relatively large chamber within the lower end portion thereof for reception of soil and seed, said chamber being of sufficient size to accommodate the roots of the seed when sprouted and sufficient soil to cover the seed, a side wall of the chamber being provided with a relatively large transverse opening which communicates with the upper portion of the chamber at one side of and above the bottom of the latter, said opening being of sufficient size to permit the seed to sprout upwardly through the same when the stake is driven into the ground at such inclination, said stake further being formed with a relatively small axial water supply passage which opens at its lower end into the top and centrally of said chamber and which opens at its upper end through the upper end of the stake, a removable plug closing the upper end of said passage, an arm pivoted at one end on the plug for horizontal swinging adjustment, and a plant shield carried by the other end of said arm and positionable to overlie the plant growing from said chamber.

WILLIAM L. GOULD.

REFERENCES CITED

The following references are of record in the file of this patent:

UNITED STATES PATENTS

| Number | Name | Date |
|---|---|---|
| 2,067,589 | Antrim | Jan. 12, 1937 |
| 1,380,253 | Rodger | May 31, 1921 |
| 2,152,869 | Campbell | Apr. 4, 1939 |
| 1,984,265 | Hamer | Dec. 11, 1934 |
| 2,072,165 | Fow | Mar. 2, 1937 |
| 2,281,927 | Fischer | May 5, 1942 |

FOREIGN PATENTS

| Number | Country | Date |
|---|---|---|
| 4,075 | Great Britain | A. D. 1907 |
| 300,570 | Germany | Sept. 17, 1917 |